US012605997B2

(12) United States Patent
Cackley et al.

(10) Patent No.: US 12,605,997 B2
(45) Date of Patent: Apr. 21, 2026

(54) CORNER COVER, SEALING ASSEMBLY AND METHOD OF INSTALLING THE CORNER COVER

(71) Applicant: ARNOLD JÄGER HOLDING GMBH, Hannover (DE)

(72) Inventors: Jason Cackley, South Bend, IN (US); Raymond Young, Hannover (DE); Kevin Casey, Hannover (DE); Leon Bogucki, Rolling Prairie, IN (US); Scott Koppen, Wanatah, IN (US)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 101 days.

(21) Appl. No.: 18/380,838

(22) Filed: Oct. 17, 2023

(65) Prior Publication Data

US 2024/0123801 A1 Apr. 18, 2024

Related U.S. Application Data

(60) Provisional application No. 63/417,085, filed on Oct. 18, 2022.

(51) Int. Cl.
| | |
|---|---|
| *B60J 10/21* | (2016.01) |
| *B60J 10/246* | (2016.01) |
| *B60P 3/34* | (2006.01) |
| *B60J 10/30* | (2016.01) |

(52) U.S. Cl.
CPC ............. *B60J 10/21* (2016.02); *B60J 10/246* (2016.02); *B60P 3/34* (2013.01); *B60J 10/30* (2016.02)

(58) Field of Classification Search
CPC .... B60P 3/34; B60P 3/341; B60J 10/21; B60J 10/246; B60J 10/30; B60J 10/00; B60J 10/40
USPC ...... 296/165, 171, 175, 26.08, 26.09, 26.12, 296/26.13
See application file for complete search history.

(56) References Cited

U.S. PATENT DOCUMENTS

| | | | | |
|---|---|---|---|---|
| 3,958,369 | A * | 5/1976 | Mathellier | ............ E06B 7/2309 |
| | | | | 49/490.1 |
| 4,712,826 | A | 12/1987 | Omori | |
| 6,527,278 | B1 | 3/2003 | Norris | |
| 6,966,590 | B1 * | 11/2005 | Ksiezopolki | ........... B60J 10/235 |
| | | | | 49/495.1 |
| 8,408,625 | B1 * | 4/2013 | Ksiezopolski | ........... B60J 10/00 |
| | | | | 296/171 |
| 9,045,027 | B2 | 6/2015 | Young | |
| 9,625,037 | B2 | 4/2017 | Young | |
| 10,208,860 | B2 | 2/2019 | Young | |
| 10,323,749 | B2 | 6/2019 | Maloney | |

* cited by examiner

*Primary Examiner* — Joseph D. Pape
(74) *Attorney, Agent, or Firm* — Barnes & Thornburg LLP

(57) ABSTRACT

The present disclosure relates to a corner cover, comprising a first elongated section; a second elongated section, joined to the first elongated section in a connection area, wherein the first elongated section and the second elongated section extending away from each other in different directions; a flip section; and an attachment section.

11 Claims, 6 Drawing Sheets

CORNER COVER, SEALING ASSEMBLY AND METHOD OF INSTALLING THE CORNER COVER

PRIORITY CLAIM

This application claims priority under 35 U.S.C. § 119(e) to U.S. Provisional Application No. 63/417,085, filed Oct. 18, 2022, which is expressly incorporated by reference herein.

BACKGROUND

The present disclosure relates to sealing systems, and particularly to sealing systems for slide out rooms.

SUMMARY

According to the present disclosure, a corner cover is described, in particular for a sealing system provided on a sidewall, such as a sidewall of a recreational vehicle. The corner cover comprises a first elongated section, a second elongated section, joined to the first elongated section in a connection area, wherein the first elongated section and second elongated section extending away from each other in different directions, a flip section, and an attachment section. Thereby, each of the elongated sections comprises a curved portion and transition portions joined to the curved portion defining an interior of the respective elongated section for accommodating the seals of the sealing system, at least in part, wherein each of the elongated sections comprises an open end on just one of their front sides or front faces for receiving the seal in the interior of the elongated sections, and wherein the flip section is joined to the transition portion of at least one of the elongated sections such that the flip section protrudes into the interior of the respective elongated section, allowing the flip section to be clamped by a seal accommodated in the respective elongated section.

The present disclosure also describes a sealing assembly, in particular for a sidewall, such as a sidewall of a recreational vehicle. The sealing assembly comprises a sealing system comprising a first longitudinally elongated seal having a first cut edge, and a second longitudinally elongated seal having a second cut edge, wherein the elongated seals extending away from each other in different directions, wherein each of the seals comprises a base, a bulb portion movably attached to the base in a cantilevered manner and a wiper extending from the base, wherein the bulb portion has an arcuate portion extending into a sidewall portion and into an inner wall defining an enclosed space within the respective bulb portion; and a corner cover, comprising a first elongated section; a second elongated section, joined to the first elongated section in a connection area, wherein the first elongated section and the second elongated section extending away from each other in different directions; a flip section; and an attachment section; wherein each of the elongated sections comprises a curved portion and transition portions joined to the curved portion defining an interior of the respective elongated section.

The present disclosure also describes a sealing assembly, in particular for a sidewall, such as a sidewall of a recreational vehicle. The sealing assembly comprises a sealing system comprising a first longitudinally elongated seal having a first cut edge, and a second longitudinally elongated seal having a second cut edge, wherein the elongated seals extending away from each other in different directions, wherein each of the seals comprises a base, a bulb portion movably attached to the base in a cantilevered manner and a wiper extending from the base, wherein the bulb portion has an arcuate portion extending into a sidewall portion and into an inner wall defining an enclosed space within the respective bulb portion; and a corner cover, comprising a first elongated section; a second elongated section, joined to the first elongated section in a connection area, wherein the first elongated section and the second elongated section extending away from each other in different directions; a flip section; and an attachment section; wherein each of the elongated sections comprises a curved portion and transition portions joined to the curved portion defining an interior of the respective elongated section.

Thereby, the seals of the sealing system are accommodated in the interior at least in part, covering the cut edges of the seals, wherein each of the elongated sections comprises an open end on one of their front sides or front faces for receiving the seals in the interior of the elongated sections, and wherein the flip section is joined to the transition portion of at least one of the elongated sections such that the flip section protrudes into the interior of the respective elongated section, wherein the flip section is clamped between the bulb portion and the base of the seal accommodated in the respective elongated section.

The present disclosure also describes a method for installing a corner cover, comprising the steps of, providing a sealing system attached on sidewall around an rectangular opening, such as a sidewall of a recreational vehicle, the sealing systems comprises a first longitudinally elongated seal having a first cut edge and installed on a vertical surface of the sidewall and a second longitudinally elongated seal having a second cut edge and installed on a horizontal surface of the sidewall, wherein each of the seals comprises a base, a bulb portion movably attached to the base in a cantilevered manner and a wiper extending from the base, wherein the bulb portion has an arcuate portion extending into a sidewall portion and into an inner wall defining an enclosed space within the respective bulb portion, providing a corner cover, comprising a first elongated section; a second elongated section, joined to the first elongated section in a connection area, wherein the first elongated section and the second elongated section extending away from each other in different directions; a flip section; and an attachment section; wherein each of the elongated sections comprises a curved portion and transition portions joined to the curved portion defining an interior of the respective elongated section and each of the elongated sections comprises an open end on one of their front sides or front faces; and wherein the flip section is joined to the transition portion of at least one of the elongated sections such that the flip section protrudes into the interior of the respective elongated section;

bending up the bulb portion of at least one of the seals to provide a gap between the respective base and the respective inner wall of the at least one seal;

placing the flip section of the provided corner cover inside the gap provided between the respective base and the respective inner wall;

snapping back the bulb portion tucking the flip section of the corner cover under the bulb portion;

accommodating the seal inside the interior of the respective elongate section, at least in part, covering the cut edges of the seals; and fixedly connecting or attaching the corner cover to the sealing system or the sidewall via the attachment section, e.g., by gluing, mechanical fastening, adhering, ultrasonic welding.

Additional features of the present disclosure will become apparent to those skilled in the art upon consideration of the embodiments shown in the drawings.

BRIEF DESCRIPTION OF THE DRAWINGS

FIG. 1A and FIG. 1B show different versions of a sealing system 1, 1' each comprising a first seal 2 and a second seal 3 installed at a corner of a rectangular opening 50, such as an opening 50 in which a slide out room moves on a recreational vehicle (not shown). As can be seen from FIG. 1A the rectangular opening 50 is defined by a horizontal surface 50a and a vertical surface 50b of a sidewall 51 of the recreational vehicle that receives the slide out room. The first seal 2 is installed on the vertical surface 50b and the second seal 3 is installed on the horizontal surface 50a. By analogy, the seals 2, 3 of the sealing system 1' of FIG. 1B are installed on the respective surfaces 50a, 50b (not shown).

Figure 1A:
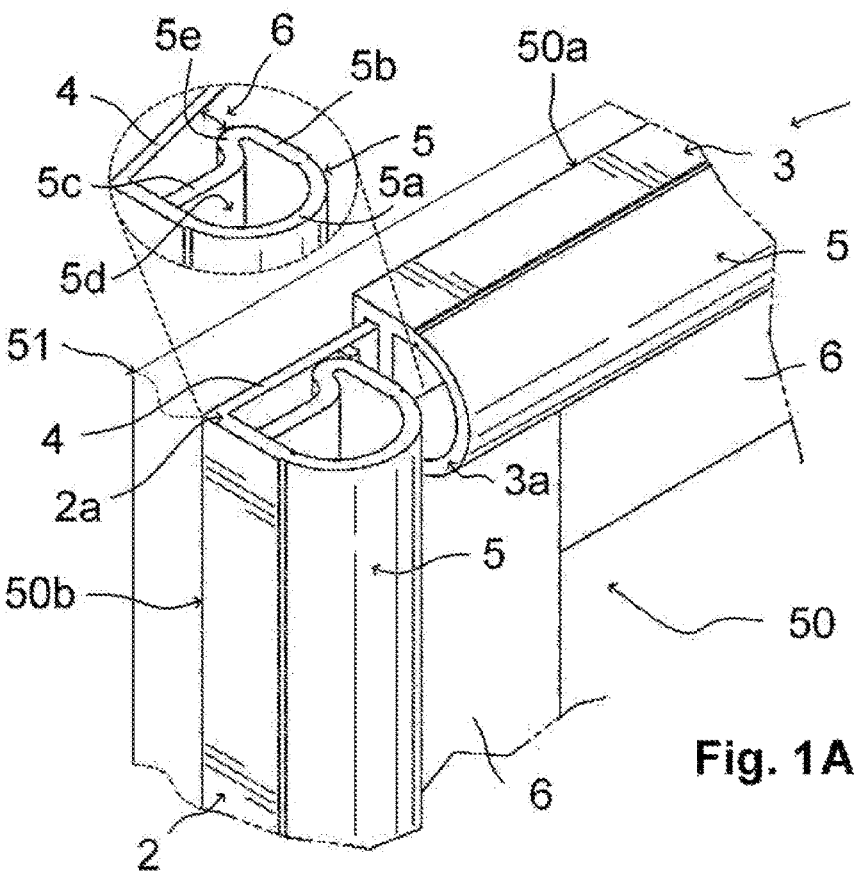
FIG. 1A, 1B are showing corner areas of different sealing systems.

Each of the seals 2, 3 comprises a base 4 and a bulb portion 5 attached to the base 4 in a cantilevered manner over the base 4. Further, a wiper 6 extends from the base 4 of each of the seals 2, 3 into the rectangular opening 50, wherein the wipers 6 may overlap at the corners, providing a robust water-resistant sealing system 1, 1'.

The bulb portion 5 of each of the seals 2, 3 has an arcuate portion 5a extending into a sidewall portion 5b and into an inner wall 5c defining an enclosed space 5d within the respective bulb portion 5. Further, a protrusion 5e might be attached to the bulb portion 5 touching the base 4 in the position shown in FIG. 1A or FIG. 1B. As the bulb portion 5 is elastically joined to the base 4 the bulb portion 5 can be bent upwards or flipped up (see dashed section in FIG. 1A) from the base 4 providing a gap 6 between the inner wall 5c and the base 4, e.g., allowing to accommodate or clamp a flip section 11 of a corner cover 10 as described in more detail on the basis of the following figures.

In order to install these seals 2, 3 on the surfaces 50a, 50b delimiting the rectangular opening 50 they first have to be cut to the appropriate length, leaving cut ends 2a, 3a, and then fastened to the vertical and horizontal surfaces 50a, 50b, e.g., by means of a mechanical fastener, a tape, a glue or the like. As the cut ends 2a, 3a of the seals 2, 3 are visible at each of the corners of the rectangular opening 50, a corner cover 10 (e.g., FIG. 10) is installed. The sealing assembly 20 that is manufactured thereby, comprising the corner cover 10 and the seals 2, 3, provides an aesthetically pleasing appearance in the corners as well as protecting the seals 2, 3 from external influences, e.g., the enclosed space 5d. As described below, various embodiments of the corner cover 10, 10', 10", 10''', 10'''' may be installed in order to manufacture a sealing assembly 20, depending on the geometry of the seals 2, 3 and/or the type of sealing system 1, 1'.

In each embodiment of the present disclosure, the corner cover 10, 10', 10", 10''', 10'''' comprises two elongate sections 10a, 10b joined to each other in a connection area 10c and extending away from each other in different directions, e.g., perpendicular to each other. Each elongate section 10a, 10b comprises a curved portion 12, e.g., in a semi-cylindrical shape, in particular matching the arcuate geometry of the bulb portion 5 of the respective seal 2, 3 as shown in FIG. 10, 1D, e.g., by matching the radius of the curved portion 12 to the radius of the arcuate portion 5a. The curved portion 12 goes over into transition portions 13a, 13b on both (longitudinal) sides, such that the curved portion 12 and the transition portions 13a, 13b defines an interior I of the respective elongate section 10a, 10b providing a full coverage of the seals 2, 3 from above and from the (longitudinal) sides. The underside of both elongate sections 10a 10b, however, is open, providing that the respective seal 2, 3 projecting upwards from the respective surface 50a, 50b can protrude into the interior I of the respective elongate sections 10a, 10b. In order to allow accommodation of the (longitudinally) elongated seals 2, 3 each elongate section 10a, 10b comprises an open end E on just one of their front sides or front faces. The other front side or front face is closed or covered as described below.

The flip section 11 to be accommodated or clamped between the inner wall 5c and the base 4 of the respective seal 2, 3 is joined to one of the transition portions 13b, preferably along its entire length or longitudinal extension, forming an L-shape. The flip section 11 may further comprise a protrusion 11a in order to maintain a good sealing effect after installing the respective corner cover 10, 10', 10", 10''', 10''''. Further, an attachment section 14 is vertically protruding outwards (according to FIGS. 1D, 2A, 2B, 3A, 3B, 4A-C) or inwards (according to FIG. 5D) from the other transition portion 13a, preferably along its entire length or longitudinal extension. In certain embodiments of the corner cover 10''', 10'''', the attachment section 14 may be integral with the transition portions 13a, 13b or the curved portion 12 or the flip section 11, as shown by way of examples in FIG. 5A to 5C.

The material of the described components of the corner cover 10, 10', 10", 10''', 10'''' is a rubber-elastic or durometer material of, for example, approximately shore 90 A, e.g., single or multi-durometer EPDM (ethylene propylene diene monomer) or TPE (thermoplastic elastomer), manufactured by injection molding by way of example. Thus, the material is the same or at least similar to the material(s) used for the seals 2, 3. The thickness of the material of the corner cover 10, 10', 10", 10''', 10'''' is chosen to be very thin, e.g., 1 mm to 1.5 mm, to maintain the seal effectiveness in the corner areas.

Figure 1B:
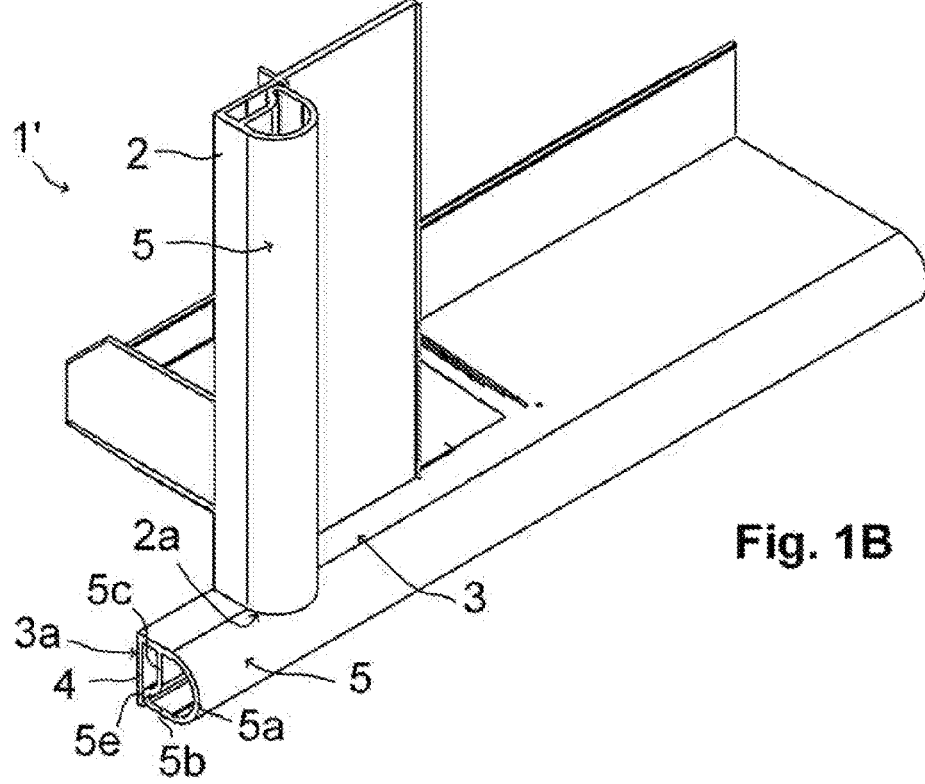
Figures 1C, 1D, 2A:
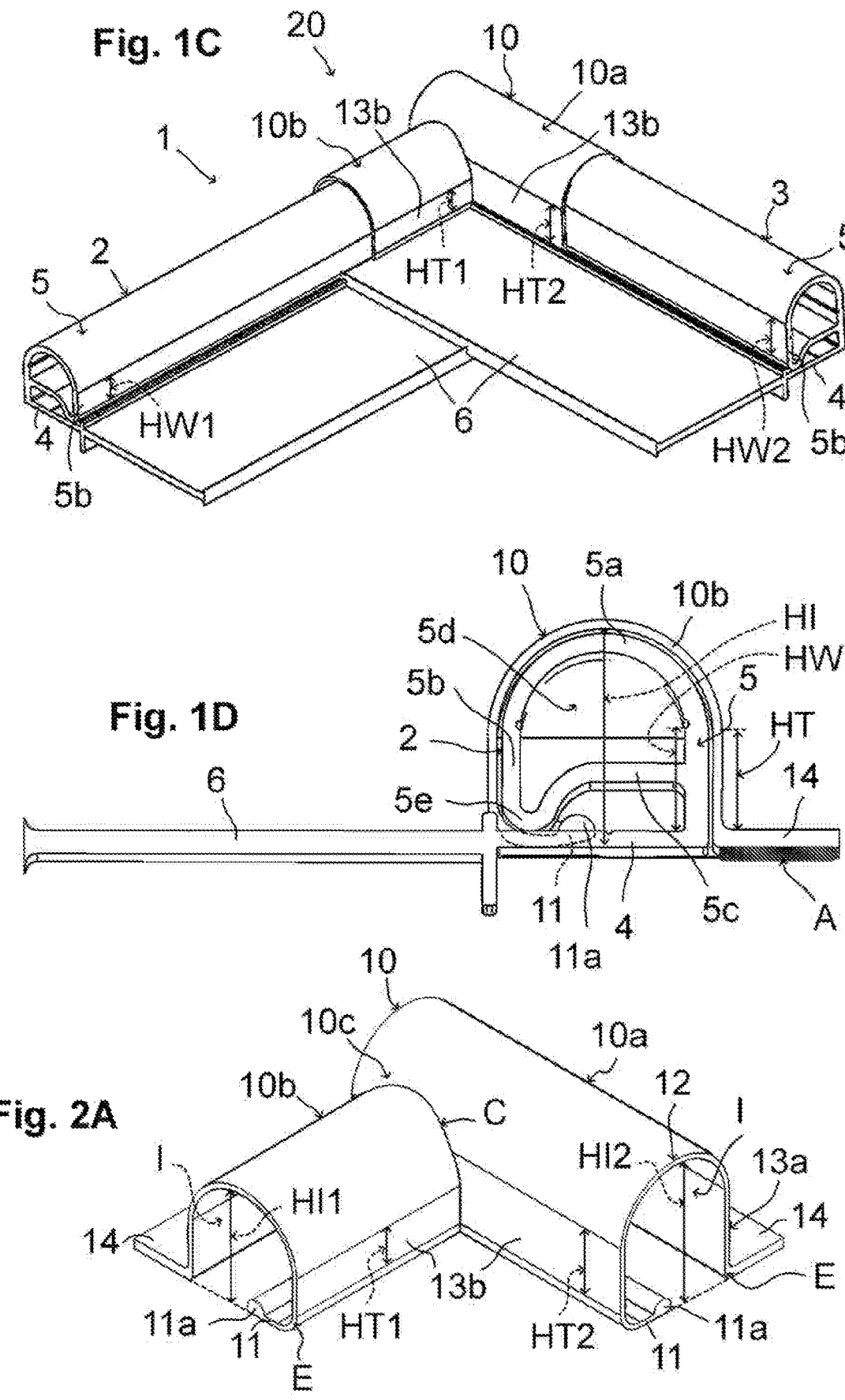
FIG. 1C is showing the sealing system of FIG. 1A with a corner cover according to a first embodiment of the present disclosure.
FIG. 1D is showing a cross sectional view of the assembly shown in FIG. 1C.
FIG. 2A, 2B are showing the first embodiment of the corner cover in a detailed view.
Figure 2B:
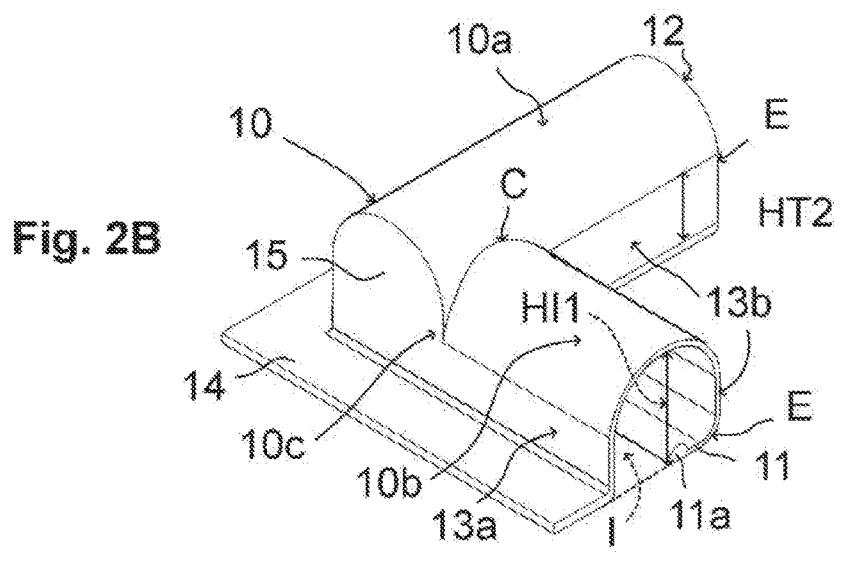

As can be seen from the different embodiments of the corner cover 10, 10' shown in FIGS. 2A, 2B and FIGS. 3A, 3B a height HT of the transition portions 13a, 13b and thus an interior height HI of the respective interior I can vary in dependence of the geometry of the seals 2, 3 to be covered. FIGS. 2A, 2B each show the corner cover 10 according to FIG. 10, which is used for accommodating seals 2, 3 having different geometries of the bulb portions 5, e.g., a combination of a first seal 2 having a standard bulb geometry with a first height HW1 of the sidewall portion 5$b$ assigned to a first height HT1 of the transition portions 13$a$, 13$b$ or first interior height HI1 of the respective interior I and a second seal 3 having a taller bulb geometry having a second height HW2 of the sidewall portion 5$b$ assigned to a second height HT2 of the transition portions 13$a$, 13$b$ or a second interior height HI2 of the respective interior I.

As in this embodiment of the corner cover 10 the transition portions 13$a$, 13$b$ or interiors I of each of the two elongate sections 10$a$, 10$b$ have different heights HT1, HT2 or interior heights HI1, HI2 both elongate sections 10$a$, 10$b$ contact each other along a curved contact line C positioned on the surface of the elongate section 10$b$ having the taller second height HT2 or second interior height HI2. This simultaneously provides that the other elongate section 10$a$ having the lower first height HT1 or lower first interior height HI1 is fully covered in the connection area 10$c$ opposite to its open end E. In order to also cover the elongate section 10$b$ with the taller second height HT2 or taller second interior height HI2 in the connection area 10$c$ opposite to its open E a closing piece 15 is (integrally) attached to this end. This provides a full coverage of the seals 2, 3 over the entire length or expansion of the corner cover 10.

Figure 3A:
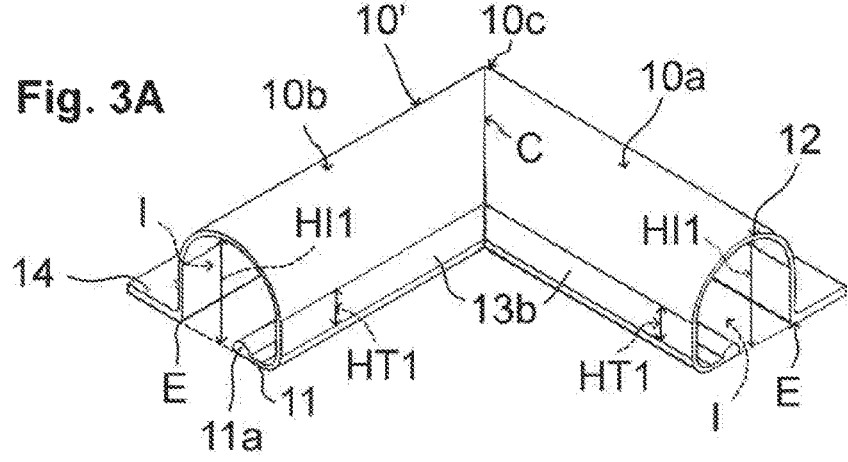
FIG. 3A, 3B are showing a second embodiment of the corner cover according to the present disclosure.
Figure 3B:
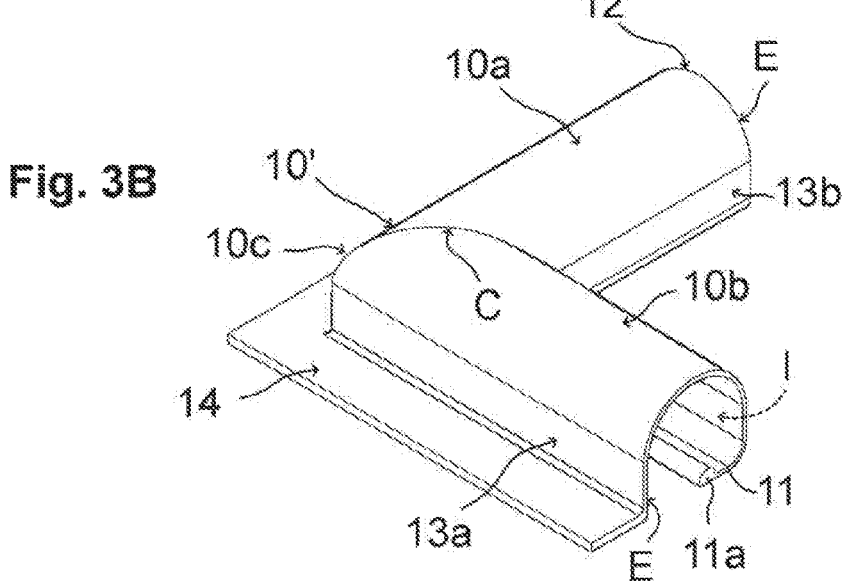

FIGS. 3A, 3B show a corner cover 10' for accommodating seals 2, 3 having identical bulb portions 5, e.g., both with a standard bulb geometry having the first height HW1 of the sidewall portion 5$b$ assigned to the first height HT1 of the transition portions 13$a$, 13$b$ or first interior height HI1 of the respective interiors I. As the transition portions 13$a$, 13$b$ or the interiors I of each of the two elongate sections 10$a$, 10$b$ have identical first heights HT1 or first interior heights HI1 in this embodiment of the corner cover 10', they fit perfectly into each other in the connection area 10$c$, leaving a symmetrical or diagonal curved contact line C. Thus, the respective ends of the two elongate sections 10$a$, 10$b$ lying opposite to their open ends E are closed or covered, providing a full coverage of the seals 2, 3 over the entire length or expansion of the corner cover 10'.

While the corner cover 10' for seals 2, 3 with identical bulb geometries 5 (s. FIG. 3A, 3B) can be universally used for every corner area of the rectangular opening 50, the corner cover 10 for seals 2, 3 with different bulb geometries (s. FIG. 2A, 2B) has to be provided in a "left handed" and a "right handed" version, depending on the arrangement of the different seals 2, 3 in the respective corner area.

Figures 4A, 4B, 4C:
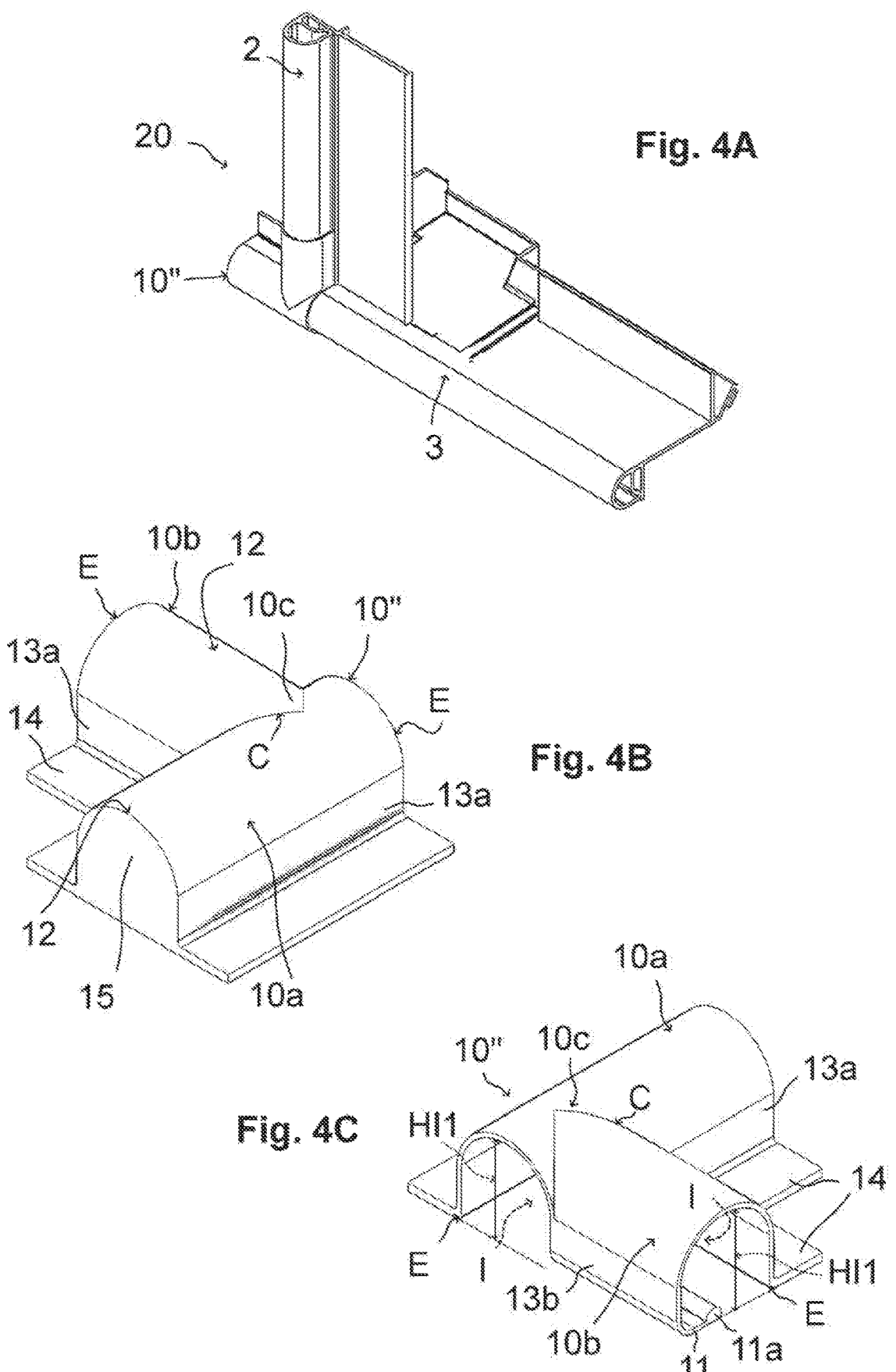
FIG. 4A, 4B, 4C are showing a third embodiment of the corner cover according to the present disclosure for a sealing system of FIG. 1B.

FIG. 4A, 4B, 4C each show a third embodiment of the corner cover 10" wherein a sealing system 1' according to FIG. 1B is to be covered in the corner area of the rectangular opening 50. In this case, the cut ends 3$a$ of the second seal 3 overlaps the cut end 2$a$ of the first seal 2, such that the elongate sections 10$a$, 10$b$ have to be joined to each other in a different manner as compared to the first and second embodiments of the corner covers 10, 10' shown in FIGS. 2A, 2B, 3A, 3B. In this embodiment one of the elongate sections 10$b$ has its open end E adjacent to the connection area 10$c$ and a closing piece 15 is (integrally) attached to the opposite end of the same elongate section 10$b$. The other elongate section 10$a$ has its open end E opposite to the connection area 10$c$, comparable to the other embodiments of the corner cover 10, 10'. This provides coverage of both cut ends 2$a$, 3$a$ that are offset to each other due to the overlapping described above. In addition, the flip section 11 is just joined to one of the elongated sections 10$b$, wherein the other elongated section 10$a$ comprises attachment sections 14 on both (longitudinal) sides.

Figure 5A:
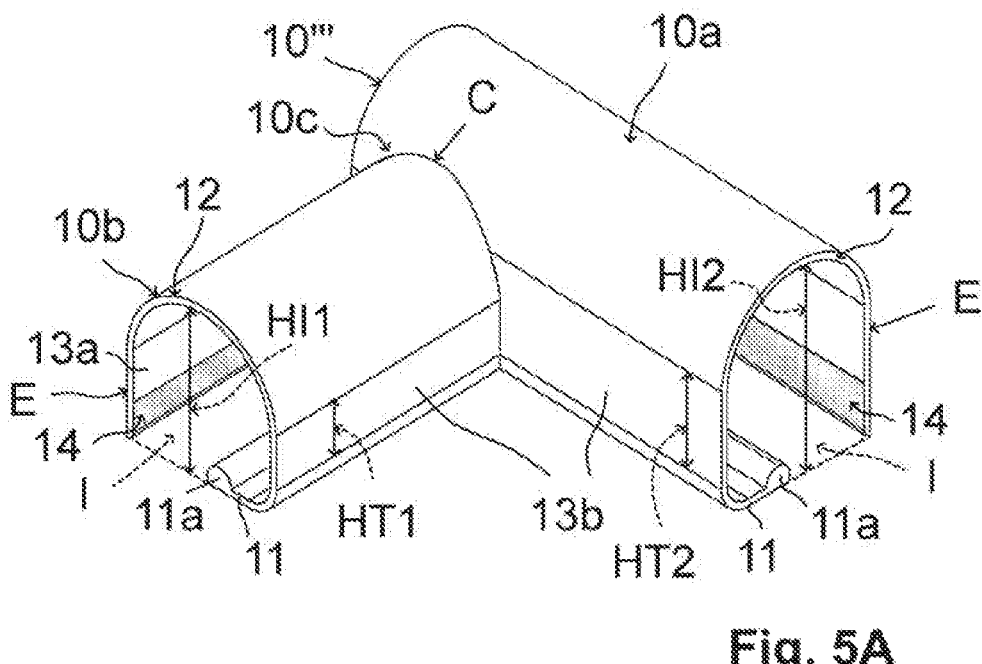
FIG. 5A-D are showing further embodiments of the corner cover according to the present disclosure.
Figure 5B:
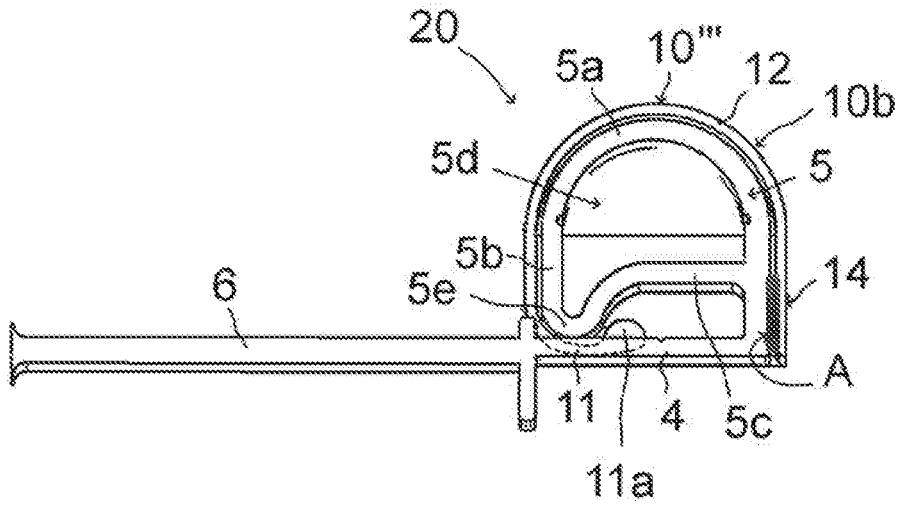
Figure 5C:
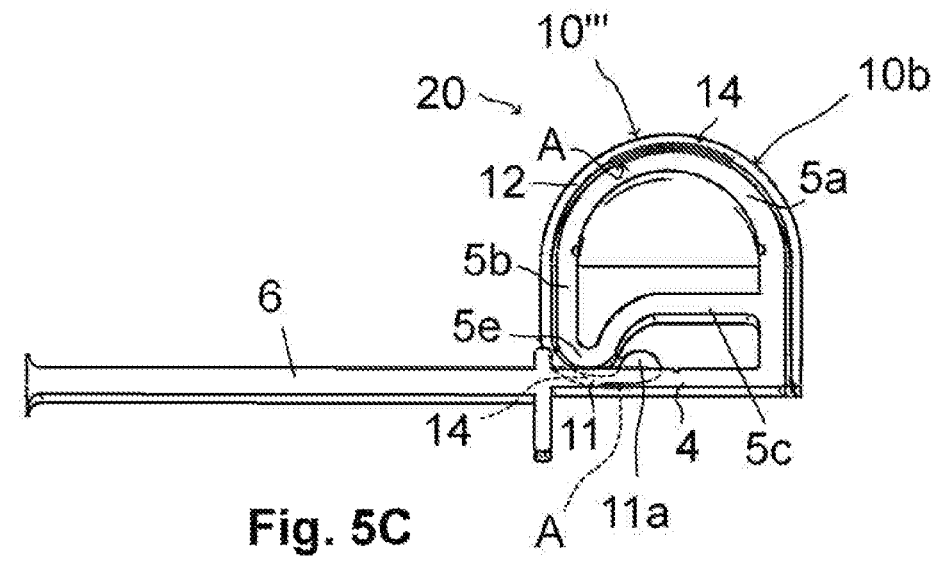
Figure 5D:
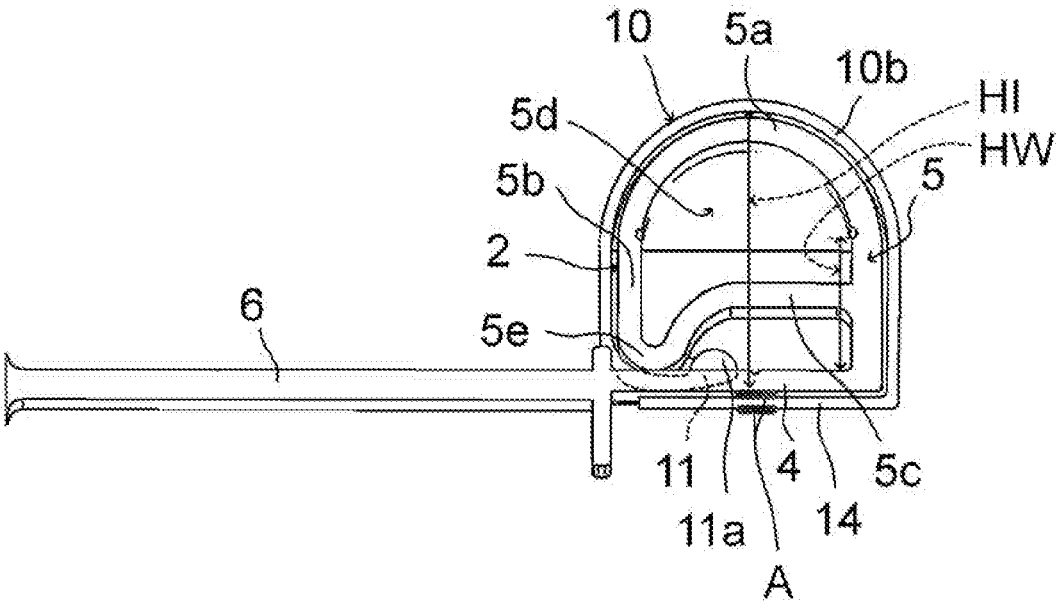

FIG. 5A, 5B, 5C each show embodiments of the corner cover 10''', 10'''' in which the attachment section 14 is integral with the transition portions 13$a$, 13$b$ and/or the curved portion 12 and/or the flip section 11. This means that there is no additional attachment section 14, but the other sections or portions are used for attaching the respective corner cover 10''', 10''''. The construction of the respective corner cover 10''', 10'''', e.g., the design of the flip section 11, the transition portions 13$a$, 13$b$ and the curved portion 12 is similar to the design of the corner cover 10' of the second embodiment, wherein also different heights HT1, HT2 of the transition portions 13$a$, 13$b$ or interior heights HI1, HI2 of the respective interiors I like in the corner cover 10 of the first embodiment are possible (not shown). It is also possible to adapt the design of the third embodiment of the corner cover 10" to integrate the attachment section 14 into the flip section 11 and/or the transition portions 13$a$, 13$b$ and/or the curved portion 12.

In each embodiment, the corner cover 10, 10', 10", 10''', 10'''' provides a synergistical effect with the seals 2, 3 installed in the corner area of the rectangular opening 50 as the respective curved portion 12 is matching the geometry of the bulb portion 5 of the respective seal 2, 3, maintaining a good sealing effect and saving space. Further, the flip section 11 of the corner cover 10 allows for an easy installation of the corner cover 10 to the special sealing system 1, 1' when manufacturing the sealing assembly 20. This is done as follows:

After installation of the seals 2, 3 on the respective surfaces 50$a$, 50$b$, the appropriate corner cover 10, 10', 10", 10''', 10'''' is provided. In the following, the bulb portion 5 of the respective seal 2, 3 is flipped up or bend up, to provide a gap 6 between the respective base 4 and the respective inner wall 5$c$. The flip section 11 of the provided corner cover 10, 10', 10", 10''', 10'''' is then placed inside the gap 6 of the respective seal 2, 3 and the bulb portion 5 is snapped back, tucking the respective flip section 11 under the respective bulb portion 5. Simultaneously the bulb portion 5 of the respective seal 2, 3 is accommodated inside the interior I of the respective elongate section 10$a$, 10$b$, fully covering it.

These steps can be performed simultaneously or in a continuous workflow, e.g., by sliding the flip section 11 under the bulb portion 5 and, consequently, flipping the bulb portion 5 up and placing the flip section 11 into the gap 6 and the bulb portion 5 inside the interior I of the respective elongate section 10$a$, 10$b$ simultaneously. Preferably, the person installing the corner cover 10, 10', 10", 10''', 10'''' may support the flipping of the bulb portion 5 by manually bending it up and/or tilting the corner cover 10, 10', 10", 10''', 10'''' slightly. Afterwards, the corner cover 10, 10', 10", 10''', 10'''' is brought to the horizontal, snapping the bulb portion 5 back and tucking the flip section 11 under. This is done for both seals 2, 3 in the corner area, successively or simultaneously, pre-attaching the respective corner cover 10, 10', 10", 10''', 10'''' to the sealing system 1, 1'. Consequently, the flipping feature of the seals 2, 3 can be used for pre-assembly of the corner cover 10, 10', 10", 10''', 10''''.

In order to safely or permanently hold the respective corner cover 10, 10', 10", 10''', 10'''' in the corner area of the sidewall 51, the respective pre-assembled corner cover 10, 10', 10", 10''', 10'''' is attached to the sidewall 51 of the recreational vehicle and/or the sealing system 1, 1' in the attachment section 14, either by assorted attachment means A, e.g. by gluing or mechanical fastening (e.g., screwing, riveting, nailing) or by adhesion (adhesive tape), or by ultrasonic welding or the like. If the attachment section 14 is integral with the transition portions 13$a$, 13$b$ (FIG. 5A, 5B) and/or the curved portion 12 (FIG. 5C) and/or the flip section 11 (FIG. 5C), the respective corner cover 10''', 10'''' is glued, mechanically fastened, adhered, welded to the seal 2, 3 directly. If a separate attachment section 14 is provided (FIG. 1A, 2A, 2B, 3A, 3B, 4A, 4B, 4C, 5D) the respective corner cover 10, 10', 10'' is glued, mechanically fastened, adhered, welded to the respective sidewall 51.

In comparative sealing systems for slide out rooms, the longitudinally elongated seals are cut out in transition-length pieces and installed on the sidewall of the recreational vehicle that receives the slide out room in such a way that the seals lay next to each other in the corner areas of a rectangular opening provided in the sidewall. This provides a continuous or uninterrupted sealing effect throughout the whole sealing system around the rectangular opening. After installing the individual transition-length pieces of the seal the cut ends are visible at each of the corner areas causing an aesthetical non-pleasing appearance and also exposing the cut ends to external influences.

The following clauses include contemplated and non-limiting embodiments:

Clause 1. Corner cover, in particular for a sealing system provided on a sidewall, such as a sidewall of a recreational vehicle, comprising:
a first elongated section;
a second elongated section, joined to the first elongated section in a connection area, wherein the first elongated section and the second elongated section extending away from each other in different directions;
a flip section; and
an attachment section;
wherein each of the elongated sections comprises a curved portion and transition portions joined to the curved portion defining an interior of the respective elongated section for accommodating the seals of the sealing system, at least in part,
wherein each of the elongated sections comprises an open end on one of their front sides for receiving the seal in the interior of the elongated sections, and
wherein the flip section is joined to the transition portion of at least one of the elongated sections such that the flip section protrudes into the interior of the at least one elongated section, allowing the flip section to be clamped by a seal accommodated in the respective elongated section.

Clause 2. Corner cover according to clause 1, any other clause, or combination of clauses, wherein the attachment section is joined to the transition portion of at least one of the elongated sections such that the attachment section protrudes away from the interior of the at least one elongated section.

Clause 3. Corner cover according to clause 1, any other clause, or combination of clauses, wherein the attachment section is joined to the transition portion of at least one of the elongated sections such that the attachment section protrudes into the interior of the at least one elongated section.

Clause 4. Corner cover according to clause 1, any other clause, or combination of clauses, wherein the attachment section is integral with or integrated into at least one of the transition portions and/or integral with or integrated into the curved portion and/or integral or integrated into the flip section.

Clause 5. Corner cover according to clause 1, any other clause, or combination of clauses, wherein the flip section comprises a protrusion projecting upwards into the interior of the respective elongate section.

Clause 6. Corner cover according to clause 1, any other clause, or combination of clauses, wherein the transition portions of both of the elongated sections have the same height and/or wherein the interiors of both of the elongated sections have the same interior heights for accommodating two seals having the same geometry.

Clause 7. Corner cover according to clause 1, any other clause, or combination of clauses, wherein the transition portions of the first elongated section have a first height and the transition portions of the second elongated section have a second height, wherein the first height and the second height are different for accommodating seals having different geometries.

Clause 8. Corner cover according to clause 1, any other clause, or combination of clauses, wherein the interior of the first elongated section has a first interior height and the interior of the second elongated section has a second interior height, wherein the first interior height and the second interior height are different for accommodating seals having different geometries.

Clause 9. Corner cover according to clause 1, any other clause, or combination of clauses, wherein the flip section is joined to at least one of the transition portions along its entire length or longitudinal extension.

Clause 10. Corner cover according to clause 1, any other clause, or combination of clauses, wherein the first elongated section and the second elongated section extend perpendicularly away from each other.

Clause 11. Corner cover according to clause 1, any other clause, or combination of clauses, wherein each of the elongated sections has just one open end, wherein the open ends of both elongated sections are positioned opposite to the connection area or at least one of the open ends is positioned adjacent to the connection area.

Clause 12. Sealing assembly for a sidewall, such as a sidewall of a recreational vehicle, comprising:
a sealing system comprising
a first longitudinally elongated seal having a first cut edge, and
a second longitudinally elongated seal having a second cut edge, wherein the elongated seals extending away from each other in different directions,
wherein each of the seals comprises a base, a bulb portion movably attached to the base in a cantilevered manner and a wiper extending from the base,
wherein the bulb portion has an arcuate portion extending into a sidewall portion and into an inner wall defining an enclosed space within the respective bulb portion; and
a corner cover, comprising
a first elongated section;
a second elongated section, joined to the first elongated section in a connection area, wherein the first elongated section and the second elongated section extending away from each other in different directions;
a flip section; and
an attachment section;
wherein each of the elongated sections comprises a curved portion and transition portions joined to the curved portion defining an interior of the respective elongated section, wherein the seals of the sealing system are accommodated in the interior at least in part, covering the cut edges of the seals, wherein each of the elongated sections comprises an open end on one of their front sides for receiving the seals in the interior of the elongated sections, and wherein the flip section is joined to the transition portion of at least one of the elongated sections such that the flip section protrudes into the interior of the respective elongated section, wherein the flip section is clamped between the bulb portion and the base of the seal accommodated in the respective elongated section.

Clause 13. Sealing assembly according to clause 12, any other clause, or combination of clauses, wherein the arcuate portion of the bulb portion being positioned adjacent to the curved portion of the respective elongate section, wherein the geometry of the arcuate portion of the bulb portion matches the geometry of the curved portion.

Clause 14. Sealing assembly according to clause 12, any other clause, or combination of clauses, wherein the seals and the cover portion are made from a rubber-elastic or durometer material of, for example, approximately shore 90 A, e.g., single or multi-durometer ethylene propylene diene monomer or thermoplastic elastomer.

Clause 15. Sealing assembly according to clause 12, any other clause, or combination of clauses, wherein the corner cover being attached to the sidewall and/or to at least one of the seals via the attachment section, e.g., by gluing, mechanical fastening, adhering, ultrasonic welding or the like.

Clause 16. Method for installing a corner cover on a sealing system, comprising the steps of:

providing a sealing system attached to a sidewall around an rectangular opening, such as a sidewall of a recreational vehicle, the sealing systems comprises:

a first longitudinally elongated seal having a first cut edge and installed on a vertical surface of the sidewall and a second longitudinally elongated seal having a second cut edge and installed on a horizontal surface of the sidewall, wherein each of the seals comprises a base, a bulb portion movably attached to the base in a cantilevered manner and a wiper extending from the base, wherein the bulb portion has an arcuate portion extending into a sidewall portion and into an inner wall defining an enclosed space within the respective bulb portion, providing a corner cover, comprising a first elongated section;

a second elongated section, joined to the first elongated section in a connection area, wherein the first elongated section and the second elongated section extending away from each other in different directions;

a flip section; and an attachment section;

wherein each of the elongated sections comprises a curved portion and transition portions joined to the curved portion defining an interior of the respective elongated section and each of the elongated sections comprises an open end on one of their front sides; and wherein the flip section is joined to the transition portion of at least one of the elongated sections such that the flip section protrudes into the interior of the respective elongated section;

bending up the bulb portion of at least one of the seals to provide a gap between the respective base and the respective inner wall of the at least one seal;

placing the flip section of the provided corner cover inside the gap provided between the respective base and the respective inner wall;

snapping back the bulb portion tucking the flip section of the corner cover under the bulb portion;

accommodating the seal inside the interior of the respective elongate section, at least in part, covering the cut edges of the seals; and fixedly connecting the corner cover to the sealing system and/or the sidewall via the attachment section.

Clause 17. Method according to clause 16, any other clause, or combination of clauses, wherein both of the longitudinally elongated seals being attached to the sidewall via the base, in particular by gluing or mechanical fastening or adhering.

Clause 18. Method according to clause 16, any other clause, or combination of clauses, wherein the corner cover is fixedly connected to the sidewall and/or the sealing system either by attachment means, in particular by a glue or mechanical fastening means, e.g., screws, rivets, nails, or by an adhesive, e.g., an adhesive tape, or by ultrasonic welding or the like.

What is claimed is:

1. A corner cover for a sealing system provided on a sidewall of a recreational vehicle, comprising:

a first elongated section;

a second elongated section, joined to the first elongated section in a connection area, wherein the first elongated section and the second elongated section extending away from each other in different directions;

a flip section; and an attachment section;

wherein each of the elongated sections comprises a curved portion and transition portions joined to the curved portion defining an interior of the respective elongated section for accommodating the seals of the sealing system, at least in part, wherein each of the elongated sections comprises an open end on one of their front sides for receiving the seal in the interior of the elongated sections, and wherein the flip section is joined to the transition portion of at least one of the elongated sections such that the flip section protrudes into the interior of the at least one elongated section, allowing the flip section to be clamped by a seal accommodated in the respective elongated section.

2. The corner cover of claim 1, wherein the attachment section is joined to the transition portion of at least one of the elongated sections such that the attachment section protrudes away from the interior of the at least one elongated section.

3. The corner cover of claim 1, wherein the attachment section is joined to the transition portion of at least one of the elongated sections such that the attachment section protrudes into the interior of the at least one elongated section.

4. The corner cover of claim 1, wherein the attachment section is integral with or integrated into at least one of the transition portions and/or integral with or integrated into the curved portion and/or integral or integrated into the flip section.

5. The corner cover of claim 1, wherein the flip section comprises a protrusion projecting upwards into the interior of the respective elongate section.

6. The corner cover of claim 1, wherein the transition portions of both of the elongated sections have the same height and/or wherein the interiors of both of the elongated sections have the same interior heights for accommodating two seals having the same geometry.

7. The corner cover of claim 1, wherein the transition portions of the first elongated section have a first height and the transition portions of the second elongated section have a second height, wherein the first height and the second height are different for accommodating seals having different geometries.

8. The corner cover of claim 1, wherein the interior of the first elongated section has a first interior height and the interior of the second elongated section has a second interior height, wherein the first interior height and the second interior height are different for accommodating seals having different geometries.

9. The corner cover of claim 1, wherein the flip section is joined to at least one of the transition portions along its entire length or longitudinal extension.

10. The corner cover of claim 1, wherein the first elongated section and the second elongated section extend perpendicularly away from each other.

11. The corner cover of claim 1, wherein each of the elongated sections has just one open end, wherein the open ends of both elongated sections are positioned opposite to the connection area or at least one of the open ends is positioned adjacent to the connection area.

\* \* \* \* \*